Jan. 16, 1968  R. J. ANETSBERGER  3,363,541
CRUMB COLLECTING DEEP FAT FRYER
Filed Jan. 25, 1967  3 Sheets-Sheet 1

INVENTOR
Richard J. Anetsberger
by Horton, Davis, Brewer
and Brugman
Attys

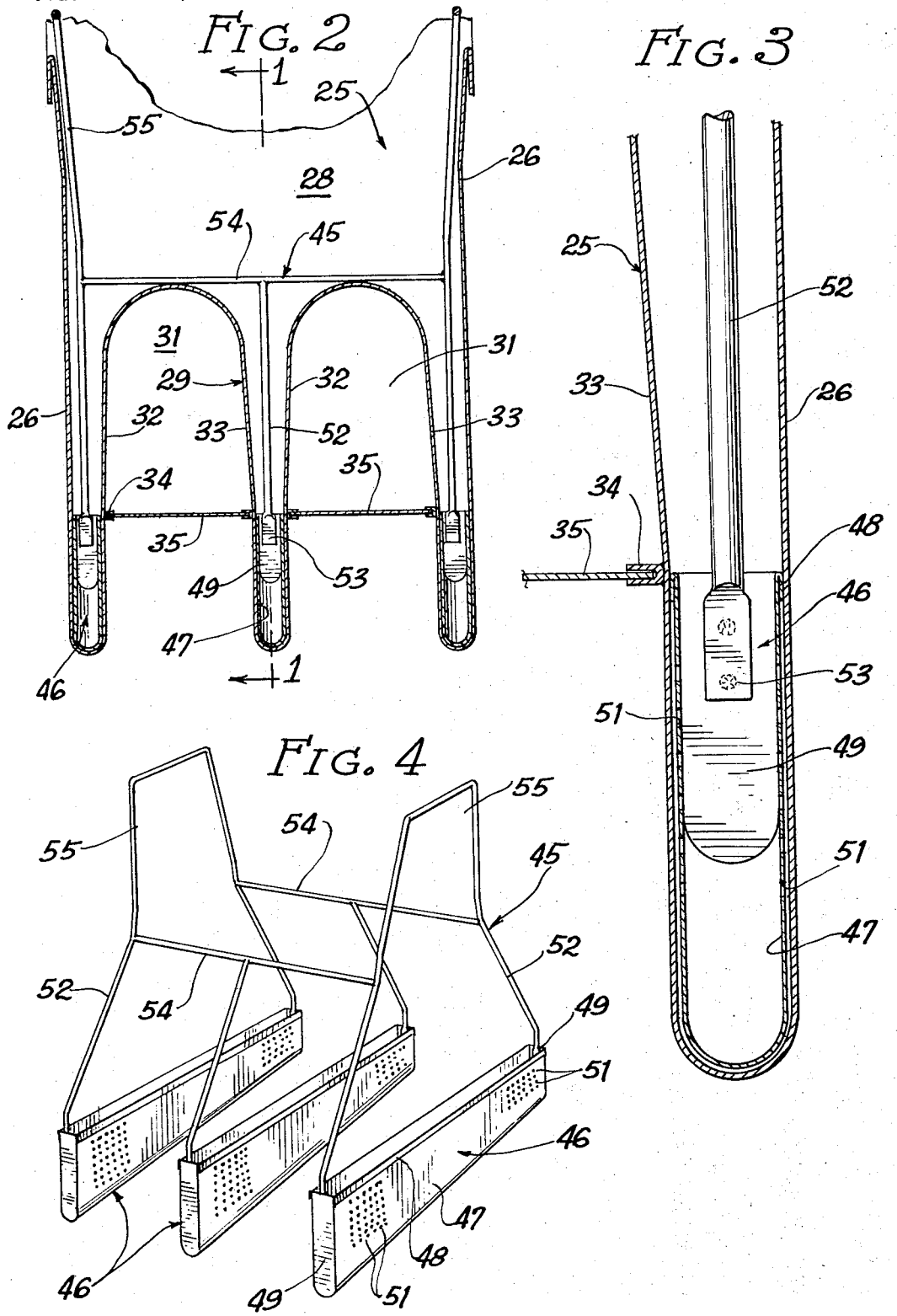

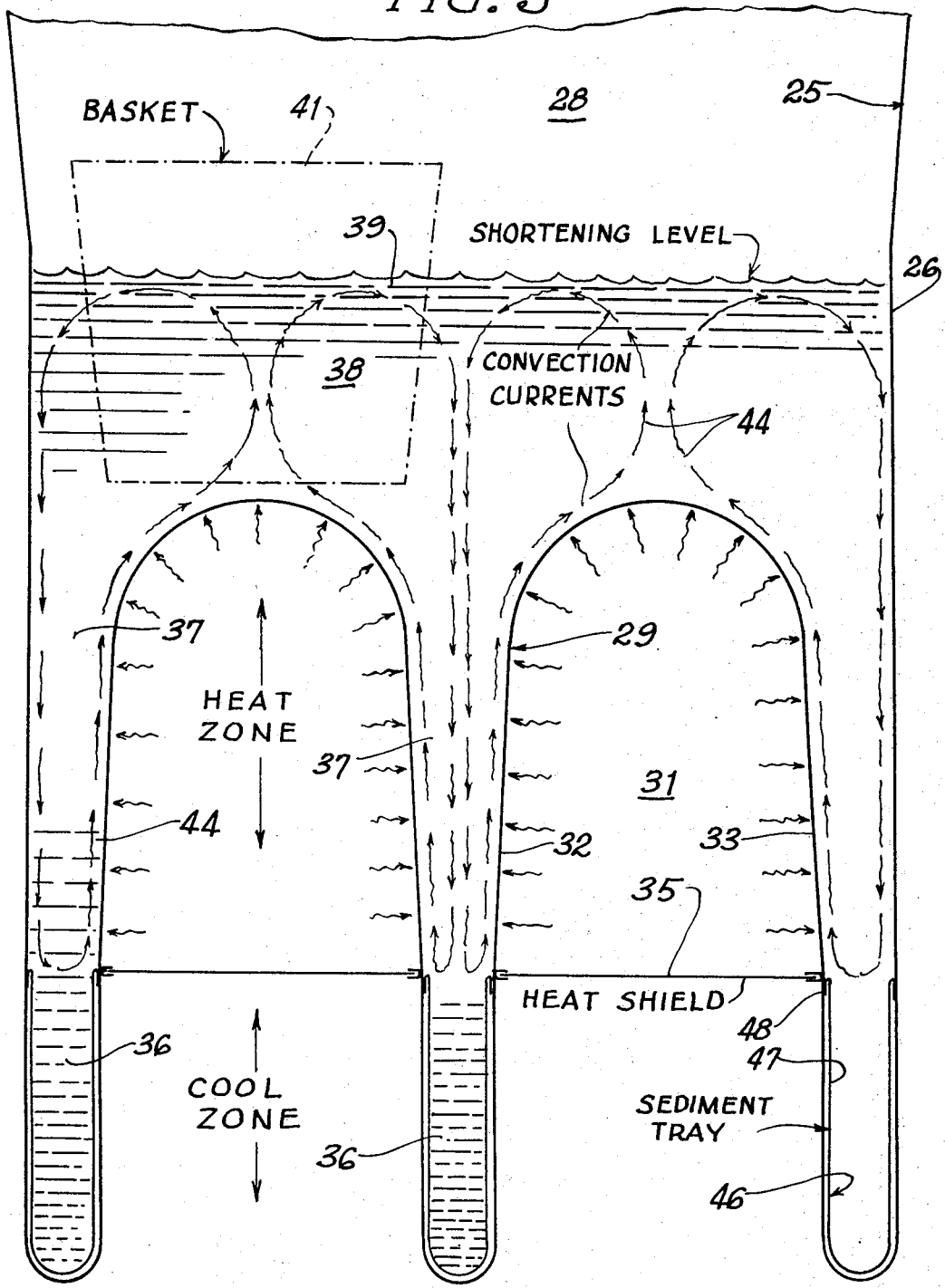

United States Patent Office 3,363,541
Patented Jan. 16, 1968

3,363,541
CRUMB COLLECTING DEEP FAT FRYER
Richard J. Anetsberger, Northbrook, Ill., assignor to Anetsberger Brothers, Inc., Northbrook, Ill., a corporation of Illinois
Filed Jan. 25, 1967, Ser. No. 611,694
7 Claims. (Cl. 99—408)

ABSTRACT OF THE DISCLOSURE

Tray for collecting fat-saturated crumbs for removal from deep fat commercial fryer having heat exchanger means disposed approximately centrally between the fat level and the bottom of the pot.

BACKGROUND OF THE INVENTION

Field of the invention

The invention relates generally to commercial deep fat fryers, and more particularly to lengthening the useful life of the shortening or fat used therein by collecting dislodged food particles or fat-saturated crumbs in a cool zone provided at the bottom of the fryer pot to prevent their burning and facilitating their removal from the fryer.

Description of the prior art

Trays for collecting and removing fat-saturated crumbs from deep fat fryers are disclosed in the prior art, for example, in U.S. Letters Patent Nos. 2,360,727 of Oct. 17, 1944, and 2,570,628 of Oct. 9, 1951, but such devices retain the crumbs in the fat-heating zone, which leads to their being burned and results in rapid deterioration of the cooking fat. An attempt to overcome these difficulties is disclosed in my prior U.S. Patent No. 3,217,-704, issued Nov. 16, 1965, which comprises heat exchanger means disposed approximately centrally between the fat level and the bottom of the pot to provide a cool zone below the fat-heating zone into which the fat-saturated crumbs will fall, but this requires shutting off the heating means completely and draining of all of the fat from the fryer in order to flush out the sediment thus collected in the cool zone or, at the very least, drainage and replacement of a considerable quantity of the fat from the fryer in order to remove the collected crumbs.

SUMMARY OF THE INVENTION

This invention provides for ready removal of fat-saturated crumbs from a commercial deep fat fryer at any time without shut-down or excessive waste of the fat therein, with collection of the crumbs being accomplished in such manner as to eliminate any possibility of their burning and thereby deleteriously affecting the cooking fat. It contemplates providing a pot having an upper frying zone, an intermediate fat-heating zone and a lower cool zone, with heat exchanger means for transferring heat to the fat in the intermediate zone and inducing convection currents carrying the fat to and from the frying zone, and heat shield means for protecting against heat transfer to the cool zone, and a crumb tray disposed wholly within the cool zone for collecting fat-saturated crumbs therein and readily removable to dispose of the collected crumbs.

In the drawings:

FIG. 2 is a transverse vertical sectional view taken substantially on the line 2—2 of FIG. 1;

FIG. 3 is a detail vertical section, like FIG. 2, through one of the laterally separate sections of the crumb tray, but on a larger scale;

FIG. 4 is a perspective view of the crumb tray removed from the pot; and

FIG. 5 is a transverse diagrammatic sectional view similar to, but on a larger scale than FIG. 2.

DESCRIPTION OF THE PREFERRED EMBODIMENT

Figure 1:
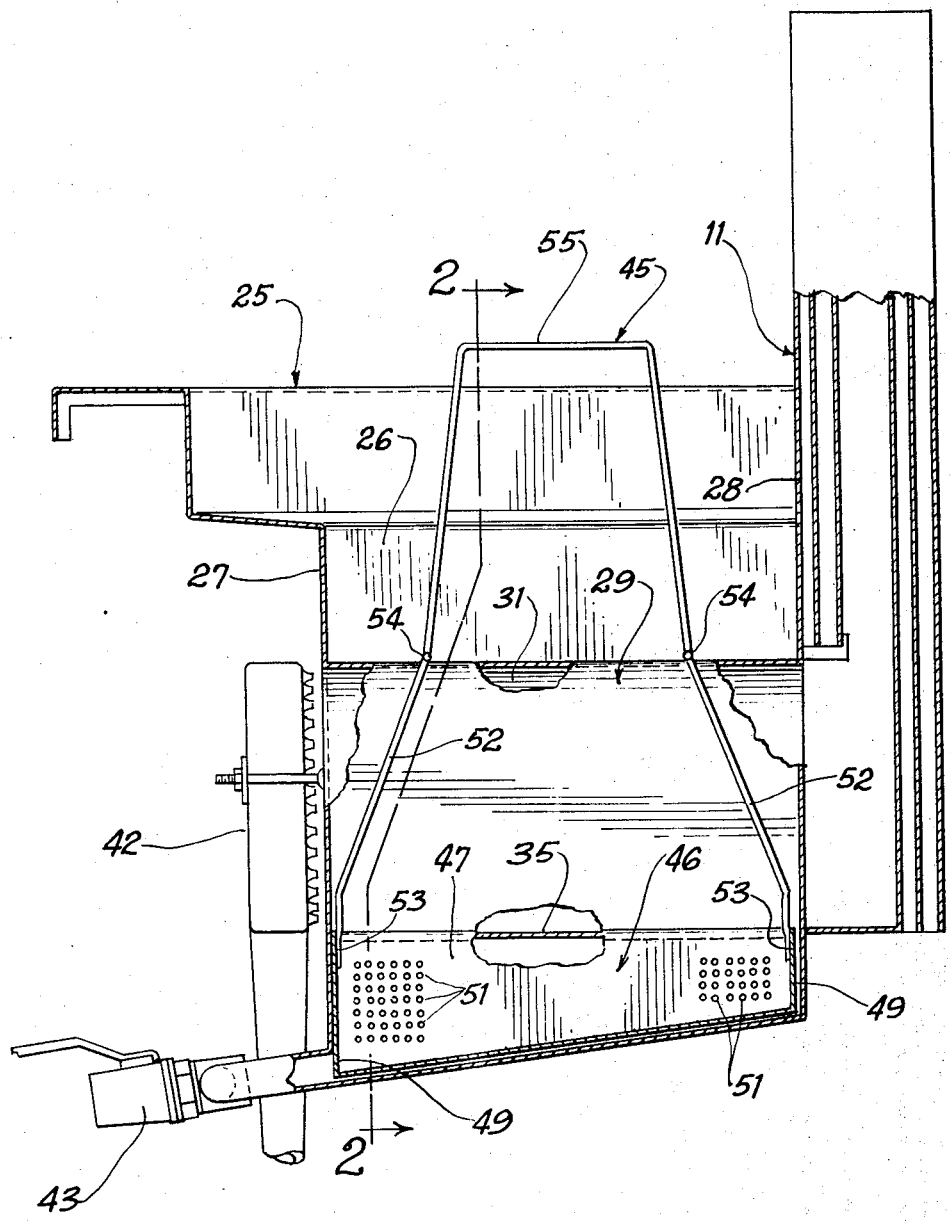
FIGURE 1 is a side view of a deep fat fryer embodying the features of the invention, with the pot and crumb tray in vertical section, as seen substantially on the line 1—1 of FIG. 2, and with parts thereof broken away.

Referring more particularly to the drawings, reference numeral 11 indicates in general a deep fat fryer embodying the features of this invention which is quite similar in construction to that disclosed in my referenced prior Patent No. 3,217,704. As also illustrated and described in the latter, the fryer comprises a cooking pot, generally indicated by reference numeral 25, which is made up of side walls 26 (FIG. 2), a front wall 27 (FIG. 1), a rear wall 28 and a substantially M-shaped bottom 29. As best seen in FIGS. 2 and 5, the bottom 29 of the pot defines a pair of laterally spaced heating sections or combustion chambers 31 extending between the front and rear walls 27 and 28 (FIG. 1) and each formed by upstanding portions 32 and 33. It will be appreciated that the resulting combustion chambers 31 are open at their front and rear ends, the front and rear walls 27 and 28 of the pot being shaped to leave these ends of the combustion chambers open while closing the lower parts of the pot defined by the bottom 29 and the side walls 26.

About one-third of the way up, the upstanding portions 32, 33 of the pot bottom 29 are provided on their opposing surfaces with substantially horizontal flanged brackets 34 (FIGS. 2 and 3) of any suitable construction to provide opposing grooves for slidably receiving plates, baffles or heat shield means 35. Each such heat shield means 35 thus defines the bottom of the associated combustion chamber 31 and functions to prevent direct transfer of heat from the combustion chamber to the lower parts of the wall portions 32 and 33 extending below the slot-forming brackets 34. These lower parts of the wall portions 32 and 33, together with the side walls 26 and front and rear walls 27, 28, define a cool zone 36 (FIG. 5) as the lower part of the pot 25 having laterally separated portions on each side of the combustion chambers 31. The intermediate portion of the pot 25 extending upwardly from the heat shield means 35 to a short distance above the uppermost portions of the pot bottom 29 comprises a fat-heating zone 37, while the upper portion of the pot defines a frying zone 38. The normal level of the shortening or cooking fat is indicated in FIG. 5 by reference numeral 39, and a standard basket 41 is diagrammatically shown in broken lines in FIG. 5 in the usual cooking position for immersing the food to be fried in the heated fat.

Mounted forwardly of the respective combustion chambers 31 in any suitable manner are heat-supplying means illustrated in FIG. 1 in the form of upstanding burners 42 positioned to direct flames issuing therefrom rearwardly into the combustion chambers 31. Incidentally, while considering FIG. 1, it will be noted that the lowermost walls of the pot 25 defined by its bottom 29 slope downwardly and forwardly to facilitate draining of the cooking fat therefrom through the agency of a manually operable drain valve 43 in well-known manner.

Referring back to FIG. 5, the heat generated by the burners 42 in the combustion chambers 31 will be transmitted through the walls of the combustion chambers to heat the cooking fat and, in a manner that will be readily understood, to resultingly induce convection currents in the fat in the general directions indicated by arrows 44. As indicated in my prior U.S. Patent No. 3,217,704, such an arrangement is extremely advantageous in a commercial deep fat fryer, particularly because it results in minimum fat temperature recovery time. As articles break away from the food being cooked, they become saturated with the fat and fall into one of the separate sections of the cool zone 36. The convection currents in the fat are sufficient to prevent such loose particles or crumbs from sticking to the walls of the pot in either the intermediate heating zone 37 or the upper frying zone 38. In the fryer disclosed in No. 3,217,704, the fat-saturated crumbs so collected in the bottom of the pot could be removed therefrom only by draining a very considerable quantity of the cooking fat from the fryer. From an actual operating standpoint, in fact, it is necessary to completely drain the fryer to enable satisfactory flushing to eliminate such collected crumbs. This requires that the fryer be shut down, since it can be very harmful to the pot to have the burners operating with no cooking fat in the pot.

The present invention overcomes these difficulties by providing a unique crumb tray for collecting and effecting ready removal of the crumbs at any time from the pot without requiring drainage of any of the cooking fat therefrom or shutting down of the burners. This crumb tray is designated generally by reference numeral 45 and is shown by itself and removed from the pot in FIG. 4 and mounted in operative position in FIGS. 1 and 2. This tray 45 comprises three separate sections 46 adapted to be disposed, respectively, in the separate portions of the cool zone 36 and each of which is made up of a U-shaped member defining side walls 47 having reversely bent upper marginal flanged portions 48, and front and rear end plates 49 secured in any suitable manner, as by welding, to the U-shaped portion thereof to define a crumb-receiving receptacle. As best seen in FIG. 1, the bottom of each such receptacle slopes downwardly from rear to front to the same degree as the lowermost walls of the pot bottom 29.

The side walls 47 of the crumb tray sections 46 are provided with apertures 51 to permit the fat to drain therefrom as the crumb tray is lifted from the pot. In order to facilitate removal of the crumb tray from the pot and proper disposition of the same therein, each separate section 46 is provided at each end with an angularly disposed and upwardly extending handle portion 52, the lower end of which is secured at 53 (FIG. 3) as by welding, or the like, to the inner surface of the associated end plate 49. The upper ends of these handle portions 52 are secured, as by welding, to a transversely extending rod 54, and the outer handle portions 52 are joined in any desired manner to, or formed as extensions of, suitable handle grip portions 55 which extend upwardly adjacent the side walls 26 of the pot, when the crumb tray is in operative position, and terminate at a point above the latter convenient for manual operation.

From FIGS. 1 and 2 it will be seen that the rods 54 have the function, in addition to securing the separate sections 46 together as a unit, of limiting downward movement of the crumb tray 45 relative to the pot 25 by engagement with the uppermost portions of the pot bottom 29. When the crumb tray is separated from the cooking pot, as shown for example in FIG. 4, the side walls 47 and their marginal portions 48 are bowed slightly outwardly. As a result, as the crumb tray is moved downwardly into its lowermost or operative position within the pot, the marginal portions 48 of the associated walls 47 will be engaged by the adjacent wall portions of the pot and squeezed together to be retained in sealing engagement with the pot, as best illustrated in FIG. 3. This will effectively prevent any fat-saturated crumbs falling between the pot and the side walls of the crumb tray while, at the same time, facilitating ready insertion of the crumb tray into, and removal from, the pot.

The upper marginal portions 48 of the side walls 47 of the crumb tray 45 also have the important additional function of directing the heat-induced convection currents in the fat (as represented in FIG. 5 by the arrows 44) away from the cool zone 36 at the bottom portion of the pot. This shields the fat-saturated crumbs collected in the crumb tray from the convection currents to prevent their being stirred thereby back up into the fat-heating and frying zones. Consequently, the fat-saturated crumbs collected in the crumb tray 45 may be left therein almost indefinitely without being burned. It also will be appreciated that as the crumb tray 45 is lifted from the pot 26 by means of the handles 52–55 to remove collected fat-saturated crumbs from the pot, excess fat in the separate sections 46 of the tray will be permitted to drain automatically therefrom by virtue of the apertures 51.

From the foregoing, it is believed that those familiar with the art will readily recognize and appreciate the unique features and advancement of the present invention over previously known devices of this character. Further, it will be understood that while the present invention has been described in association with a particular and preferred embodiment thereof as set forth in the accompanying drawings and above described, the same nevertheless is susceptible to change, variation and substitution of equivalents without departure from the spirit and scope of this invention. It is therefore intended that the present invention be unrestricted by the foregoing description and illustrations, except as may appear in the following appended claims.

I claim:

1. A deep fat fryer, comprising a pot for the fat having an upper frying zone, an intermediate fat-heating zone and a lower cool zone, heat exchanger means for transferring heat to the fat in said intermediate zone to induce convection currents carrying the fat to and from the frying zone, heat shield means for protecting against heat transfer to said cool zone, a crumb tray disposed in a lowermost position wholly within said cool zone for collecting fat-saturated crumbs, and handle means connected to said crumb tray and extending upwardly through said intermediate and upper zones when the tray is disposed in its lowermost position.

2. A deep fat fryer according to claim 1, wherein said pot comprises a plurality of laterally spaced heating sections dividing said cool zone into separate portions laterally spaced from each other, and said crumb tray comprises separate sections positionable respectively in said separate portions of said cool zone when said tray is disposed in its lowermost crumb-collecting position.

3. A deep fat fryer according to claim 2, wherein each said separate section of said crumb tray comprises side walls with upper marginal portions for directing heat-induced convection currents in said fat away from said cool zone.

4. A deep fat fryer according to claim 3, wherein said side walls are slightly bowed outwardly when said tray is removed from said pot so as to cause said upper marginal portions thereof to sealingly engage said pot when the tray is disposed therein in its lowermost position.

5. In a deep fat fryer according to claim 4, means forming a part of said handle means for cooperating with said pot to limit downward movement of said tray therein.

6. A deep fat fryer according to claim 3, wherein said side walls are provided with apertures for draining fat from the crumb tray as the same is lifted by said handle means from the pot.

7. A deep fat fryer according to claim 1, wherein said crumb tray comprises side walls with upper marginal portions cooperating with said pot to direct heat-induced convection currents in said fat away from said cool zone when the tray is disposed in its lowermost position.

References Cited

UNITED STATES PATENTS

| | | | |
|---|---|---|---|
| 2,360,727 | 10/1944 | Shaw | 99—408 |
| 2,521,018 | 9/1950 | Moore | 99—408 X |
| 2,570,628 | 10/1951 | Anetsberger | 99—408 |
| 3,217,704 | 11/1965 | Anetsberger | 99—408 X |

ROBERT W. JENKINS, *Primary Examiner.*